United States Patent
Benner

[11] Patent Number: 5,848,099
[45] Date of Patent: Dec. 8, 1998

[54] METHOD AND SYSTEM FOR TESTING PHASE IMBALANCE IN QPSK RECEIVERS

[75] Inventor: Scott P. Benner, Temecula, Calif.

[73] Assignee: Qualcomm Incorporation, San Diego, Calif.

[21] Appl. No.: 655,174

[22] Filed: May 30, 1996

[51] Int. Cl.[6] .......................... H04B 17/00; H04B 15/00; G06F 17/15; G01S 5/02
[52] U.S. Cl. .................. 375/226; 375/365; 375/210; 364/728.06; 342/357; 342/356
[58] Field of Search ..................... 375/226, 316, 375/330, 254, 200, 365, 208, 219, 210; 342/357, 394; 369/59; 329/372; 364/728.06; 396/128; 348/413; 341/116

[56] References Cited

U.S. PATENT DOCUMENTS

| | | | |
|---|---|---|---|
| 4,430,722 | 2/1984 | Massen et al. | 364/728 |
| 4,445,118 | 4/1984 | Taylor et al. | 343/357 |
| 5,140,617 | 8/1992 | Kubo | 375/114 |
| 5,151,926 | 9/1992 | Chennakeshu et al. | 375/84 |

*Primary Examiner*—Stephen Chin
*Assistant Examiner*—Shuwang Liu
*Attorney, Agent, or Firm*—Russell B. Miller; Charles D. Brown

[57] ABSTRACT

A method or system (10) includes test apparatus (14) for measuring the phase imbalance in a QPSK receiver (12). A signal generator (16) provides a test signal (18) to the receiver (12), which responsively generates I channel data (20) and Q channel data (22). The system includes an oversampler (26) for producing respective sets of oversampled I and Q channel data (24) and (25). A data processing system (28) cross-correlates the sets of I and Q channel data at each of a plurality of relative phase increments, and generates a plurality of cross-correlation energy values in response to said cross-correlation. The method or system determines the phase imbalance in response to at least a largest cross-correlation energy value of said plurality of cross-correlation energy values.

14 Claims, 3 Drawing Sheets

5,848,099

METHOD AND SYSTEM FOR TESTING PHASE IMBALANCE IN QPSK RECEIVERS

BACKGROUND OF THE INVENTION

I. Field of the Invention

The present invention relates generally to test methods and systems for radio equipment. More particularly, the present invention is directed to a novel and improved test method and system for QPSK radio receivers.

II. Description of the Related Art

Quadrature phase-shifted keyed ("QPSK") receivers receive combined communication signals and separate them into two channels. The two channels are called the in-phase or I channel, and the quadrature, or Q channel. In an ideal QPSK receiver, the two channels have a ninety degree phase difference relative to one another. The amount the two channels differ from this ideal ninety degree phase difference corresponds to the phase imbalance in the receiver. For proper receipt of communications, the phase imbalance in a QPSK receiver cannot exceed a specified magnitude. Thus, manufacturers and users of QPSK receivers need a way to test phase imbalance.

Manufacturers and users of QPSK receivers sometimes find that their test equipment cannot measure phase imbalance with fine enough resolution across a receiver baseband to determine if the receiver meets the specified requirement. Added test hardware/equipment can increase measurement resolution. However, manufacturers and users of QPSK receivers frequently rely on automated test equipment to determine whether radio equipment meets specified requirements. Such additional hardware/equipment cannot always be satisfactorily used with existing automated test equipment. Further, such additional test hardware/equipment can introduce measurement errors.

The present invention accordingly provides an improved method or system for measuring phase imbalance in a QPSK receiver.

SUMMARY OF THE INVENTION

The present invention is a novel and improved method and system for measuring the phase imbalance in a QPSK receiver. A method or system in accordance with the invention preferably uses a data processing system, such as a conventional computer. The data processing system receives data samples from the I and Q channels of the receiver and cross-correlates the data. Specifically, the data processing system cross-correlates data from one channel relative to data from the other channel at a plurality of different phase shifts to determine a phase shift in the plurality having the greatest cross-correlation energy value. The data processing system approximates the phase imbalance of the receiver based on the phase shift having the greatest cross-correlation energy value.

The method or system uses a signal generator to provide a test signal for the receiver. In response to the signal, the receiver outputs digital data over both the I and Q channels. An oversampler in the method or system oversamples the I and Q channel data for increasing resolution in the phase imbalance measurement. Oversampling may include using a digital oversampling filter, or logic in the data processing system that interpolates data from the I and Q channels.

A QPSK receiver has channels with an ideal phase difference of ninety degrees relative to one another. The amount the channels in the receiver differ from this ideal phase difference corresponds to the phase imbalance in the receiver. The method or system thus searches for a phase shift relative to this ideal ninety degree phase difference that results in the greatest cross-correlation energy. In this regard, the method or system initially shifts data from the two channels ninety degrees relative to one another. Thereafter, the method or system cross-correlates data at a plurality of different phase shifts relative to the initial ninety degree phase shift to determine the phase shift of the plurality having the greatest cross-correlation energy.

The preferred method or system of the invention also includes refining the approximate phase imbalance. To accomplish this refining, the method or system determines the phase shifts in the plurality of phase shifts that result in the next two greatest cross-correlation energy values. Based in part on the difference between the next two greatest cross-correlation energy values, the method or system refines the approximate phase imbalance.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention provides a method or system for testing the phase imbalance in a quadrature phase-shifted keyed ("QPSK") receiver. The present description provides an overview of the method or system followed by a detailed discussion of a mathematical simulation of the method/system.

Fully implemented, the method or system preferably includes four major steps:

1) supplying a suitable test signal to a QPSK receiver and sampling data from the receiver's in-phase ("I") and quadrature ("Q") channels;
2) oversampling the data;
3) cross-correlating the oversampled data and approximating the phase imbalance in the receiver; and
4) refining the approximation of the phase imbalance.

Figure 1:
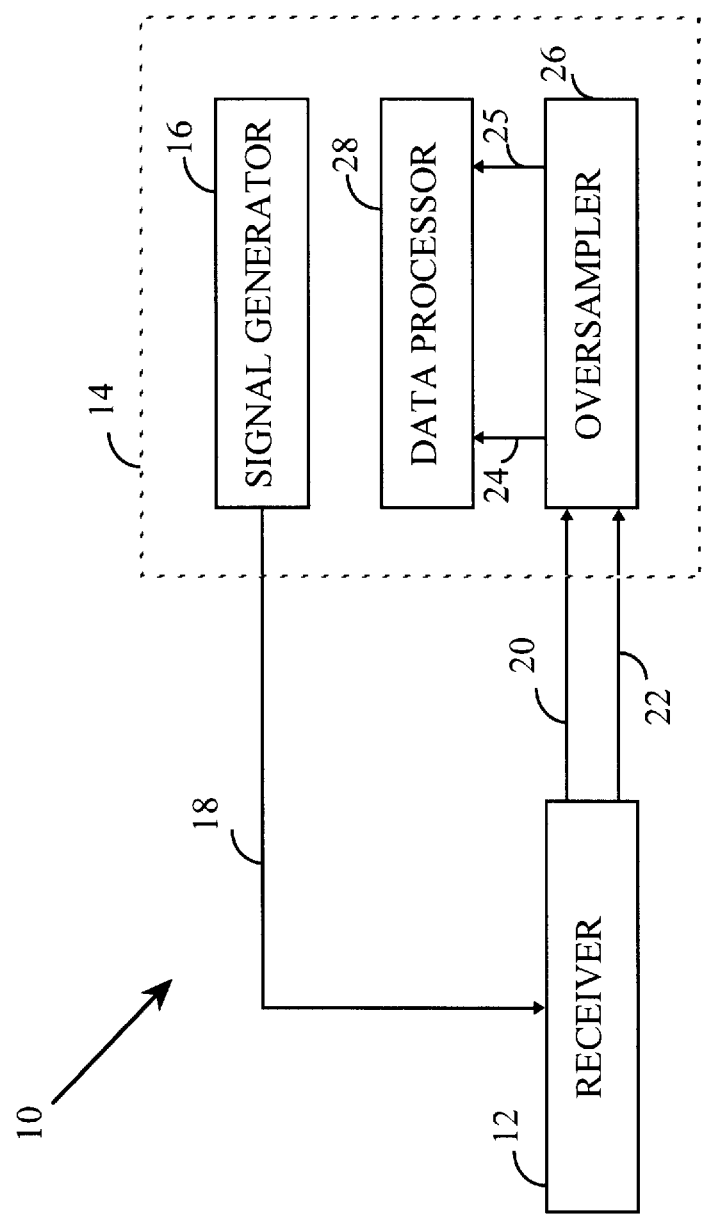
FIG. 1 illustrates a schematic block diagram of a system in accordance with the present invention for measuring the phase imbalance in a QPSK receiver.

FIG. 1 illustrates a schematic block diagram of a system 10 in accordance with the present invention for measuring the phase imbalance in a QPSK receiver 12. The system 10 includes test apparatus 14 having a conventional signal generator 16 for supplying a test signal 18 to the receiver 12. The receiver 12 receives the test signal 18 and outputs digital data 20 and 22 over its I and Q channels, respectively. In particular, the receiver 12 includes analog-to-digital converters (not shown) that output the digital data 20 and 22 of the I and Q channels, respectively.

A digital oversampling filter ("oversampler") 26 of test apparatus 14 receives the digital data 20 and 22 and produces oversampled data 24 and 25. Although shown in FIG. 1 as a separate entity, the oversampler 26 may be part of a data processing system 28 in the test apparatus 14. Specifically, the oversampler 26 may be a routine in software for producing interpolated data between digital data samples from the receiver 12.

The data processing system 28 receives the oversampled data 24 and 25 from the oversampler 26 and processes the data to perform the final two steps of the five previously listed steps. The data processing system 28 may be a conventional computer having suitable software for performing the functions described, or circuitry, such as in an integrated circuit. For example, the functions could be performed using a commercially available digital signal processing chip, supplemented by suitable logic as necessary in read-only memory ("ROM") for performing the functions in "firmware."

As indicated, the first major step includes supplying a suitable test signal 18. In the currently preferred embodiment, the signal generator 16 connects to inputs of the receiver 12 that couple the test signal 18 to the receiver's intermediate frequency processing section. The test signal 18 preferably corresponds to a simple sine wave function of the form $f(t)=\sin(\omega t)$. The function has a frequency ($\omega$) equal to the sum or difference of the intermediate frequency used in the receiver 12 and a frequency within the receiver baseband.

For testing the upper edge of the receiver baseband, the function preferably has a frequency ($\omega$) substantially equal to the sum of the intermediate frequency used in the receiver 12 and the highest frequency that is within the receiver baseband. Thus, if the receiver 12 uses an intermediate frequency of 85.38 MHz and the baseband of the communication system is from 1 KHz to 630 KHz, the frequency of the test signal 18 would be approximately 86.01 MHz (85.38 MHz plus 630 KHz). The test signal 18 thus simulates an ideal suppressed sideband transmission, i.e. an upper sideband around a carrier frequency.

In the preferred embodiment of the invention, the oversampler 26 oversamples the digital data 20 and 22 supplied by the analog-to-digital converters of the I and Q channels of receiver 12, with the oversampler 26 being employed to increase measurement resolution of phase imbalance. More particularly, in response to the test signal 18 the receiver 12 produces a demodulated analog signal for each of the I and Q channels. One of the analog signals substantially corresponds to a simple sine wave function of the form $f(t)=\sin(\omega t)$, while the other analog signal substantially corresponds to a simple sine wave function of the form $f(t)=\sin(\omega t+\theta)$. The frequency ($\omega$) in each analog signal corresponds to the difference between the test signal frequency and the receiver's intermediate frequency. $\theta$ is a constant and represents a phase difference of ninety degrees between the two signals, plus the receiver phase imbalance. The receiver's analog-to-digital converters sample the analog signals at a periodic interval and output the samples as digital data 20 and 22. Depending upon the upper frequency limit of the baseband in the receiver 12, the receiver's analog-to-digital converters may not have a fast enough sample rate for satisfactory measurement resolution of phase imbalance. In this situation, the system 10 employs an oversampler 26 for interpolating between digital data samples from the receiver's analog-to-digital converters and effectively increasing the receiver's 12 sample rate. If the receiver's 12 analog-to-digital converters do have a fast enough sample rate, the step of oversampling is preferably omitted.

Following the oversampling operation, the system 10 cross-correlates oversampled data 24 and 25 of the I and Q channels to determine cross-correlation energy values. The cross-correlation sequentially phase-shifts data of one channel relative to the data of the other channel on an increment-by-increment basis and determines a cross-correlation energy value for each incremental phase-shift. The cross-correlation involves multiplying each data sample 24, 25 from each channel by a corresponding data sample from the other channel, summing the results of all the multiplications and taking the absolute value of this sum to determine a cross-correlation energy value for a particular phase shift. The cross-correlation step places the cross-correlation energy values and corresponding phase shifts in a cross-correlation matrix for determining which phase shift resulted in the greatest cross-correlation energy.

Maximum cross-correlation energy occurs at zero phase difference between two different signals of the same frequency, i.e. when the maximas and minimas of the signals correspond to one another. In an ideal QPSK receiver the signals provided by the two channels exhibit a phase difference of ninety degrees. The system 10 therefore searches for a phase shift relative to the ideal ninety degree phase difference that results in the greatest cross correlation energy. In the preferred embodiment, the system 10 initially shifts oversampled data 24, 25 from the two channels ninety degrees relative to one another. Thereafter, the system 10 cross correlates the oversampled data 24, 25 at a plurality of different phase shifts relative to the initial ninety degree phase shift to determine which of these phase shifts results in the greatest cross-correlation energy. This phase shift approximates the phase imbalance of the receiver 12.

The final step refines the approximation. Because the demodulated analog signals each correspond to a sinusoid, the cross-correlation values should symmetrically surround a maximum cross-correlation energy value. The final step determines whether the greatest correlation energy value in the cross-correlation energy matrix occurs symmetrically. For symmetry, the next two greatest cross-correlation energy values in the matrix should: 1) occur at incremental phase-shifts immediately preceding and succeeding the phase-shift corresponding to the greatest cross-correlation energy in the matrix, and 2) substantially equal one another.

If the first criterion is not met, the previous step must be repeated at additional phase-shifts until the first criterion is satisfied to approximate the receiver phase imbalance. Assuming the first criterion is met, if the values in the cross-correlation matrix do not meet the second criterion, the final step interpolates between the next two greatest cross-correlation energy values in the matrix to more accurately determine the phase shift resulting in the greatest correlation energy. The interpolated phase-shift more closely approximates the receiver phase imbalance.

If the oversampler 26 in combination with the receiver's 12 analog-to-digital converters has a fast enough effective sampling rate, the preceding step may achieve a satisfactory approximation of the receiver phase imbalance without requiring refinement, i.e. the final step may be omitted. However, greater effective sample rates produce more data and require more processing time.

The system 10 can be further understood in view of an example that is based upon a mathematical simulation that was employed during development of the invention. The simulation was for the particular case of:

1) a QPSK receiver having a baseband of 1 KHz to 630 KHz;
2) a receiver phase imbalance of −7.25 degrees, with a specified phase imbalance no greater than 8 degrees in magnitude; and
3) four bit analog-to-digital converters in the receiver that have a sample rate of 9.8304 MHz The simulation for the foregoing particular case was conducted on a MACINTOSH personal computer, manufactured by Apple Computer of Cupertino, Calif. A commercially available software application program known as MATHCAD carried out the simulation. The simulation employed equations including generalized terms for use with receivers having parameters different from the parameters in the particular case above. For clarity and ease of explanation however, the following paragraphs describe the simulation in conjunction with equations specifically tailored to the particular case.

The simulation initially involves choosing the test signal 18 and the number of samples to collect in data processing system 28. As discussed previously, the test signal 18 should correspond to a simple sine wave function. Generally, this sine wave function has a frequency equal to the sum or difference of the intermediate frequency used in the receiver 12 and a frequency within the receiver baseband.

The simulation presumed the upper edge of the receiver baseband would be tested. In this situation, the sine wave function of the test signal 18 preferably has a frequency substantially equal to the sum of the intermediate frequency used in the receiver 12 plus the upper frequency of the receiver baseband. The receiver 12 demodulates this test signal to an analog signal for each of the receiver's I and Q channels, which the 15 receiver's analog-to-digital converters sample to output digital data 20 and 22. Each analog signal corresponds to a simple sine wave function having a frequency equal to the difference between the receiver's 12 intermediate frequency and the test signal 18 frequency. Therefore, this part of the simulation assumed the analog signals would have a frequency of approximately 630 KHz, the upper limit of the receiver baseband.

In the preferred embodiment, the number of data samples collected from the receiver's analog-to-digital converters are of size $2^n$, where n is a positive integer so that fast Fourier transform techniques can be applied to the samples if desired. Additionally, in the preferred embodiment, the 25 samples include an integer number of cycles of a fitted sinusoid in the time domain. Finally, in the preferred embodiment, the number of cycles of the fitted sinusoid is an odd number to maximize the amount of unique data. An even number of cycles could result in data that repeats from one cycle to the next, reducing the amount of unique data.

Bearing these considerations in mind, this resulted in a decision to assume the automated test equipment 14 collected 512 samples, which is $2^8$. According to Fourier analysis techniques, a sinusoid in the frequency domain can be fitted to the samples that has a frequency equal to the rate at which the receiver's 12 analog-to-digital converters sample the 35 demodulated analog signals, divided by the number of samples. This will also be the lowest frequency resolvable from the data using Fourier analysis techniques. The fitted sinusoid frequency will therefore be 9.8304 MHz (the rate of receiver 12 analog-to-digital converter sampling) divided by 512 samples, or 19.2 KHz.

Since the demodulated analog signals will have an approximate frequency of 630 KHz, the fitted sinusoid frequency of 19.2 KHz can be divided into 630 KHz. This results in 32.1825, or 33 when rounded to the nearest odd integer. Multiplying 19.2 KHz by 33 results in demodulated analog signals having a frequency of 633.6 KHz.

The next part of the simulation involves determining a satisfactory oversample for measuring a phase imbalance having a magnitude of 8 degrees or less. According to the above parameters, the demodulated analog signals have a frequency of 633.6 KHz, and the analog-to-digital converters in the receiver have a sample rate of 9.8304 MHz. The analog signals thus complete 0.06445 cycles (633.6 KHz divided by a sample rate of 9.8304 MHz) from one sample to the next in the data from the receiver's 12 analog-to-digital converters. Each analog signal therefore completes 23.20 degrees of its cycle from one sample to the next (360 degrees per cycle multiplied by 0.06445 cycles per sample). Hence, without oversampling to increase the effective sampling rate, resolution is limited to 23.20 degrees.

If the receiver's 12 analog-to-digital converters had a factor of four increase in sample rate (4× oversample above the Nyquist Rate), the sample rate would be 23.20 degrees per sample divided by four, or 5.80 degrees per sample. As 5.80 degrees per sample meets the resolution requirement of at least 8 degrees per sample resolution, a 4× oversample 26 is satisfactory. Therefore, a 4× oversample 26 was simulated.

The simulation next involves mathematically generating the oversampled data 24, 25 for the I and Q channels. Equation (1) as follows was used to generate the data for the I channel:

$$I\text{chan}_i = \cos\left[(5.80\text{ deg.})*(i)\right] + RND(\tfrac{1}{32}) \qquad \text{Eqn}(1)$$

The "5.80 deg." term of Equation (1) represents the 5.80 degrees of the cycle that the test sinusoid completes from one sample to the next in the oversampled data 24, 25 as previously determined. The "RND($\tfrac{1}{32}$)" term of Equation (1) returns a random number between $-(\tfrac{1}{32})$ and $+(\tfrac{1}{32})$ to simulate a ½bit noise dither in the four bit signal under consideration. The "i" counter in Equation (1) varied from 0 to 2047 for a total of 2048 samples (the first sample is sample zero), which is a 4× oversample of the 512 samples from the receiver's 12 analog-to-digital converters.

The data for the Q channel was generated using Equation (2) as shown below:

$$Q\text{chan}_i = \{\sin\left[(5.80\text{ deg.})*(i) - 7.25\text{ deg.}\right] + RND(\tfrac{1}{32})\} * \{[RND(0.096)] + 1\} \qquad \text{Eqn (2)}$$

Figure 2:
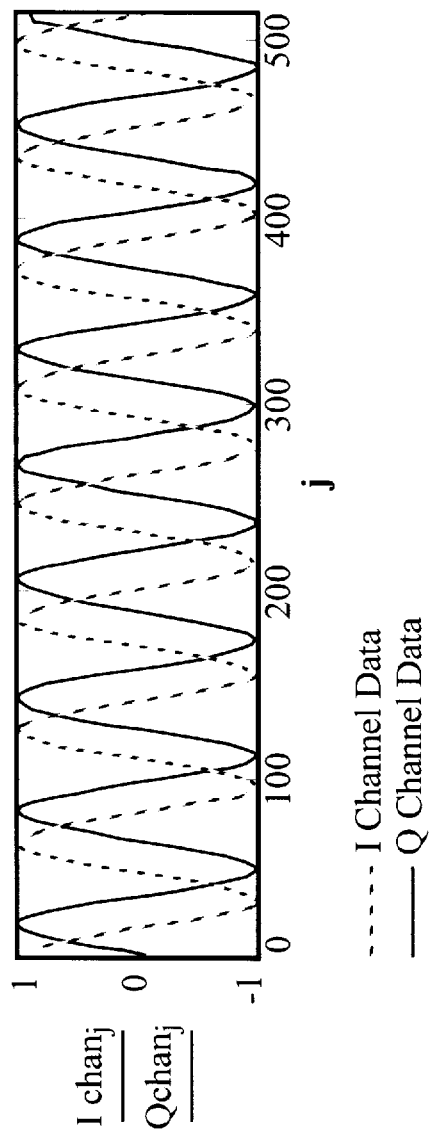
FIG. 2 illustrates a plot of data samples produced by a computer simulation of a method or system of the present invention for measuring phase imbalance in a QPSK receiver.

Since the sine function lags the cosine function by ninety degrees, the use of the sine function in Equation (2), provides ninety degree phase difference between the I and Q channels. The "−7.25 deg." term in Equation (2) represents the receiver 12 phase imbalance selected for the simulation, i.e. the amount the receiver 12 departs from the ideal ninety degree difference. The "RND($\tfrac{1}{32}$) term simulates a ½bit noise dither in the Q channel as in the I channel. Finally, the "[RND(0.096)] +1" term in Equation (2) simulates a gain imbalance in the Q channel that varies from 0.904 to 1.096. Specifically, the "RND(0.096)" term returns a random number that varies from −0.096 to +0.096, which is then added to 1.0 for simulating gain imbalance in the Q channel. FIG. 2 illustrates a plot of 512 samples (¼of the total data) generated by Equations (1) and (2) for the I and Q channels.

The following part of the simulation involves cross-correlating the data. Equation (3) and (4) as follows were used to cross-correlate the data:

$$x\text{corr}[(\text{tau}=509\text{ to }515,0)] = |\Sigma(k=0\text{ to }2047) (Q\text{chan}_k)*(I\text{chan}_{(k+tau)})| \qquad \text{Eqn (3)}$$

$$x\text{corr}[(\text{tau}=509\text{ to }515,1)] = \text{tau} - 512 \qquad \text{Eqn}(4)$$

Equations (3) and (4) generate a cross-correlation matrix, designated "xcorr" and having two columns. Each value in the first column corresponds to the cross-correlation energy for a certain phase shift. A value in the second column of a particular row corresponds to the phase shift that resulted in the cross-correlation energy represented in the first column of that row. Equation (3) generates the values for the first column of the matrix (row and column indexing begins with zero in the matrix). Equation (4) generates the values for the second column of the matrix.

The "k" counter in Equation (3) varies from zero to 2,047, i.e. according to the number of samples in the oversampled data 24 and 25 with the first sample being data sample zero. The cross-correlation matrix thus includes rows corresponding in number to the total number of samples in the oversampled data 24 and 25. The term "tau" in Equations (3) and (4) indicates the amount the simulated I channel signal is shifted relative to the simulated Q channel signal for a particular cross-correlation determination. For example, when tau has a value of one, the I channel signal is shifted one sample period relative to the Q channel signal.

Maximum cross-correlation energy occurs between two signals when the signals have zero phase difference. Ideally, the I and Q channels in the receiver have a ninety degree phase difference with one another. The amount the receiver departs from this ideal corresponds to the receiver 12 phase imbalance. Equations (3) and (4) account for the ideal ninety degree phase difference, and are indicative of the amount the I channel samples must shift relative to the Q channel samples for maximum cross-correlation energy.

More particularly, in the preferred embodiment, tau ranges from 509 to 515 in Equations (3) and (4), where a value of 512 represents a ninety degree phase shift of the I channel relative to the Q channel. Specifically, 512 represents one-quarter of the total number of samples in the oversampled data 24 and 25. Since the oversampled data 24 and 25 includes an odd integer multiple of one complete cycle of each of the demodulated signals as described in connection with the initial part of the simulation, a phase shift of one-quarter of the data samples from one channel relative to the other channel corresponds to an effective phase shift of ninety degrees.

In Equations (3) and (4), tau ranges from 509 to 515, or ±3 samples from a central tau value of 512. Each sample shift corresponds to a phase shift of a magnitude of 5.80 degrees because the test sinusoid completes 5.80 degrees of its cycle from one sample to the next in the oversampled data. Since a tau of 512 corresponds to a phase shift of ninety degrees, Equations (3) and (4) shift the data ±17.4 degrees (3*5.80) from a central ninety degree phase shift.

If the receiver 12 has a phase imbalance exceeding 17.4 degrees in magnitude, Equations (3) and (4) will not phase shift the samples sufficiently to determine the approximate maximize cross-correlation energy possible from the data. In this situation, the next two greatest cross-correlation energy values in the matrix will not occur at incremental phase-shifts immediately preceding and succeeding the phase-shift corresponding to the greatest cross-correlation energy in the matrix. Alternatively stated, the greatest energy in the cross-correlation matrix will occur at a minimum or maximum phase shift value in the matrix. This indicates that tau in Equations (3) and (4) does not have a great enough range to determine the approximate maximum cross-correlation energy value for the data, and that the phase shift corresponding to the greatest energy value in the matrix does not approximate the receiver phase imbalance.

In the particular simulation being discussed, the receiver 12 must have a phase imbalance in magnitude no greater than 8 degrees to meet specification requirements. As discussed, the tau range of 509 to 515 in Equations (3) and (4) covers a phase imbalance range of +17.4 degrees. This +17.4 degree range is more than twice the specification requirement. Thus, if the maximum cross-correlation energy is not approximated in the tau range from 509 to 515, the receiver 12 would not meet specification requirements and should be rejected as defective. To determine the phase imbalance regardless of whether or not the receiver is defective, tau should cover the entire sample range. Since there are 2,048 samples in the oversampled data 24 and 25, this has the disadvantage of requiring substantially more data processing.

The cross-correlation matrix for the simulation under consideration is as follows:

$$xcorr = \begin{bmatrix} 1003.572 & -3 \\ 1016.524 & -2 \\ 1019.143 & -1 \\ 1011.266 & 0 \\ 993.0650 & 1 \\ 964.6660 & 2 \\ 926.3889 & 3 \end{bmatrix}$$

This part of the simulation also involves producing another matrix or array by sorting rows of the cross-correlation matrix according to the value in the first column of each row in the cross-correlation matrix. The sorting occurs in descending order. Specifically, the row having the greatest value in the first column of that row becomes the first row in the new array, and the row have the second greatest value in the first column of that row becomes the second row, and so on. Thus, the sorting places the row having the greatest correlation energy at the beginning, or top of the new array. The new array, designated "imbalarr" for imbalance array is as follows:

$$imbalarr = \begin{bmatrix} 1019.143 & -1 \\ 1016.524 & -2 \\ 1011.266 & 0 \\ 1003.572 & -3 \\ 993.0650 & 1 \\ 964.6660 & 2 \\ 926.3889 & 3 \end{bmatrix}$$

Each value in the first column of the array corresponds to a cross-correlation energy for a certain phase shift. Due to the sorting used to create the array, the value at the top of the first column (1,019.143) indicates the greatest correlation energy achieved for the tau range considered in Equations (3) and (4). The value at the top of the second column (−1) indicates the phase shift in terms of shifted samples from a ninety degree phase difference to achieve this cross-correlation energy.

Figure 3:
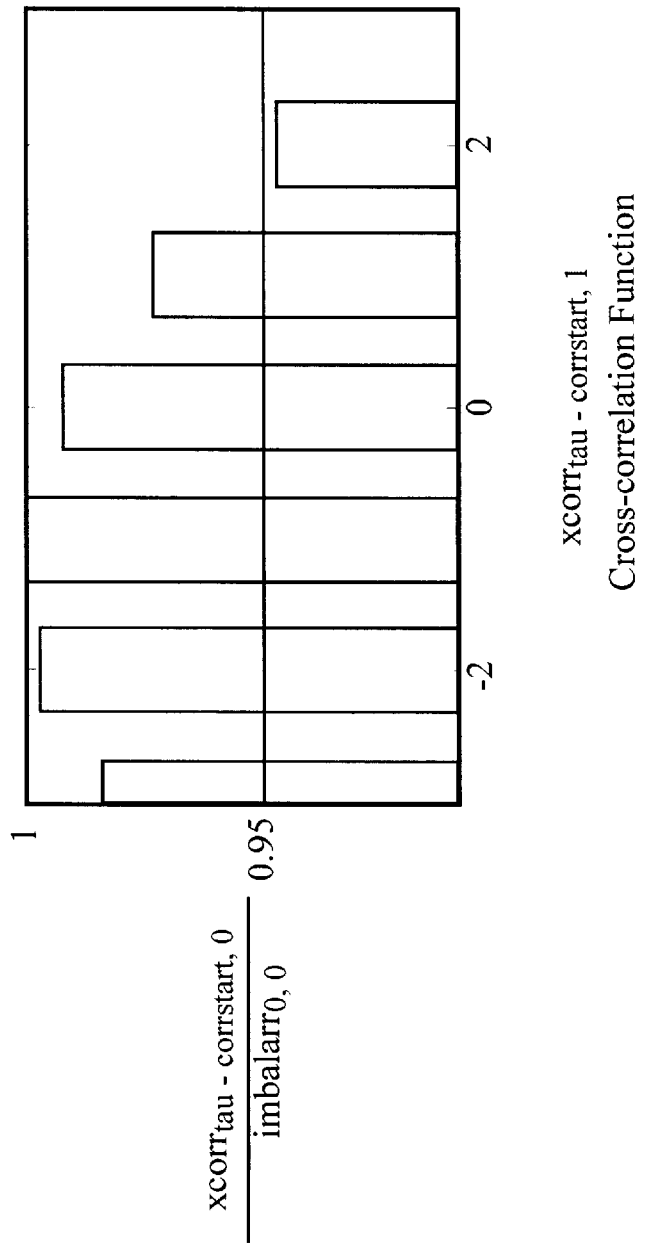
FIG. 3 is a bar graph depicting cross-correlation data for the data samples of FIG. 2.

FIG. 3 illustrates a bar graph from data from the cross-correlation matrix. In particular, FIG. 3 plots normalized values of cross-correlation energy versus the phase shift in terms of samples from ninety degrees. As can be seen in FIG. 3, the next two greatest cross-correlation energy values occur for sample shifts of −2 and 0, on either side of the −1sample shift value. Thus, the next two greatest cross-correlation energy values in the cross-correlation matrix occur at incremental phase-shifts (0 and −2) immediately preceding and succeeding the phase-shift (−1) corresponding to the greatest cross-correlation energy. Therefore, the cross-correlation energy at the −1 phase shift approximates the maximum cross-correlation energy.

Since the greatest cross-correlation energy occurs where the I and Q channel samples 24 and 25 have zero phase difference, the value at the top of second column (−1) also indicates the approximate phase imbalance for the receiver in terms of shifted samples. As each demodulated analog signal completes 5.80 degrees of its cycle from one sample to the next in the oversampled data, the −1 sample shift indicates a phase imbalance of approximately −5.80 degrees in the receiver, which does not correspond to the simulation phase imbalance of −7.25 degrees.

Equations (3) and (4) generated the cross-correlation matrix. These equations relied on shifting the oversampled data from the I and Q channels relative to one another. Therefore, the resolution of the oversampled data (5.80 degrees per sample) limits (quantizes) how accurately the phase imbalance for the receiver can be computed in this part of the simulation. In other words, this part of the simulation can only result in phase imbalance measurements in multiples of ±5.80 degrees. Phase imbalance accuracy can of course be increased by increasing the oversample rate. However, this also increases data processing time.

The final part of the simulation increases the accuracy of the previous approximation of receiver phase imbalance. Referring to FIG. 3, the greatest cross-correlation energy occurs for a sample shift of −1. The next two greatest cross-correlation energy values occur for sample shifts of −2 and 0, on either side of the −1 sample shift value. However, the cross-correlation energy is not symmetric between these two next-greatest cross-correlation energy values. Specifically, the difference between the maximum cross-correlation energy and the cross-correlation energy at −2 sample shifts is greater than the difference between the maximum cross-correlation energy and the cross-correlation energy at 0 sample shifts.

This indicates that the greatest cross-correlation energy does not occur precisely at −1 sample shifts. However, the maximum cross-correlation energy should occur between the two next-greatest cross-correlation energy values since the demodulated analog signals are sinusoidal. The final part of the simulation computes the percentage amount the next two greatest cross-correlation energy values differ from being symmetric about the maximum cross-correlation energy value in the cross-correlation matrix. This part of the simulation then uses this percentage to locate the amount of sample shifts at which the maximum cross-correlation energy likely occurs. In this regard, the difference between the maximum cross correlation energy and the cross-correlation energy at −2 sample shifts is 1,016.524 subtracted from 1,019.143, or 2.619. Further, the difference between the maximum cross-correlation energy and the cross-correlation energy at 0 sample shifts is 1,011.266 subtracted from 1,019.143, or 7.877. For symmetry, these two differences (2.619 and 7.877) should equal one another at a value midway between the two differences. The midway value is simply the average of the two differences, or 5.248.

The total error in the next greatest cross-correlation energy value is therefore the smaller difference (2.619) subtracted from the average value (5.248), or 2.629. The fractional error in the next greatest cross-correlation energy value is therefore the error (2.629) divided by the sum of the differences (2.619 and 7.877) between the maximum cross-correlation energy and the two next closest cross-correlation energy values, or 0.25048. The percentage error is the fractional error multiplied by 100, or 25.048%.

If the next-greatest cross-correlation energy value has a percentage error of 25.048%, then the phase shift for maximum cross-correlation energy probably has approximately the same percentage error. Increasing the phase shift for maximum cross-correlation energy translates to −1 added to (1)*(25.048%), or −1.25048 sample shifts. Recall, the test sinusoid completes 5.80 degrees of its cycle from one sample to the next in the oversampled data. Therefore, the receiver has a measured phase imbalance of (5.80 degrees/sample)*(−1.25048 samples), or −7.25 degrees. The simulation assumed a receiver phase imbalance of −7.25 degrees. Therefore, the measured and simulated phase imbalance compares very favorably.

In interpolating between matrix values for increasing accuracy of the measured phase imbalance, a situation could occur where there is no single greatest energy value. Rather, the matrix could include two energy values that substantially equal one another at adjacent sample shift values, with these two equal energy values being greater than the other energy values in the matrix. This indicates the phase shift resulting in maximum cross-correlation energy value for the data most likely occurs precisely between the sample shifts that resulted in these two equal energy values. In this situation, the method or system accordingly averages the two sample shifts corresponding to these two equal energy values for more precisely determining the receiver phase imbalance.

While the preferred embodiment of the invention has been illustrated and described, it will be appreciated that various changes can be made therein without departing from the spirit and scope of the invention. For example, the method or system can simply search for the phase shift resulting in maximum cross-correlation energy rather than starting from the ideal ninety degree phase difference between the I and Q channels; curve fitting techniques can be used in place of simple linear interpolation; and a separate sampler can be used to obtain digital data from QPSK receivers that do not include analog-to-digital converters. Thus, the present invention is not intended to be limited to the embodiments shown herein but is to be accorded the widest scope consistent with the principles and novel features disclosed herein.

I claim:

1. A method for measuring phase imbalance in a QPSK receiver which generates I and Q channel signals, said method comprising the steps of:

sampling said I and Q channel signals at a first sample rate to produce a set of I channel samples and a set of Q channel samples;

cross-correlating said set of I channel samples with said set of Q channel samples at each of a plurality of relative phase increments;

generating a plurality of cross-correlation energy values in response to said cross-correlating step;

determining a largest cross-correlation energy value of said plurality of cross-correlation energy values;

determining first and second next largest cross-correlation values of said plurality of cross-correlation values; and interpolating said phase imbalance from said largest and said first and second next largest cross-correlation values.

2. The method of claim 1, further comprising the step of, prior to said cross-correlating step, shifting a relative phase of said set of I channel samples and said set of Q channel samples by a predetermined phase angle approximately equal to an expected phase difference between said I channel samples and said Q channel samples.

3. The method of claim 2, wherein said predetermined phase angle is about ninety degrees.

4. The method of claim 1, further comprising the step of inputting a sinusoidal test signal to said QPSK receiver.

5. The method of claim 4, wherein said sinusoidal test signal has a frequency offset by a predetermined magnitude from an intermediate frequency of said QPSK receiver.

6. The method of claim 5, wherein said predetermined magnitude is approximately equal to an upper frequency limit of a baseband frequency band of said QPSK receiver.

7. The method of claim 6, wherein said first sampling rate is greater than or equal to N samples per cycle, and wherein a desired phase imbalance in said QPSK receiver is less than or equal to 360 degrees divided by N.

8. A system for measuring phase imbalance in a QPSK receiver which generates I and Q channel signals, said system comprising:

a digital sampler for sampling said I and Q channel signals at a first sample rate to produce a set of I channel samples and a set of Q channel samples; and a data processor for cross-correlating said set of I channel samples with said set of Q channel samples at each of a plurality of relative phase increments, for generating a plurality of cross-correlation energy values in response to said cross-correlation, for determining a largest cross-correlation energy value of said plurality of cross-correlation energy values, for determining first and second next largest cross-correlation values of said plurality of cross-correlation values, and for interpolating said phase imbalance from said largest and said first and second next largest cross-correlation values.

9. The system of claim 8, wherein said data processor shifts a relative phase of said set of I channel samples and said set of Q channel samples by a predetermined phase angle approximately equal to an expected phase difference between said I channel samples and said Q channel samples, prior to said cross-correlation.

10. The system of claim 9, wherein said predetermined phase angle is about ninety degrees.

11. The system of claim 8, further comprising a signal generator for providing a sinusoidal test signal to said QPSK receiver.

12. The system of claim 11, wherein said sinusoidal test signal has a frequency offset by a predetermined magnitude from an intermediate frequency of said QPSK receiver.

13. The system of claim 12, wherein said predetermined magnitude is approximately equal to an upper frequency limit of a baseband frequency band of said QPSK receiver.

14. The system of claim 13, wherein said first sampling rate is greater than or equal to N samples per cycle, and wherein a desired phase imbalance in said QPSK receiver is less than or equal to 360 degrees divided by N.

* * * * *